Dec. 14, 1937.  G. W. GWINN  2,102,317
CIGARETTE WEIGHER FOR CONTINUOUS ROD CIGARETTE MACHINES
Filed Sept. 7, 1935  2 Sheets—Sheet 1
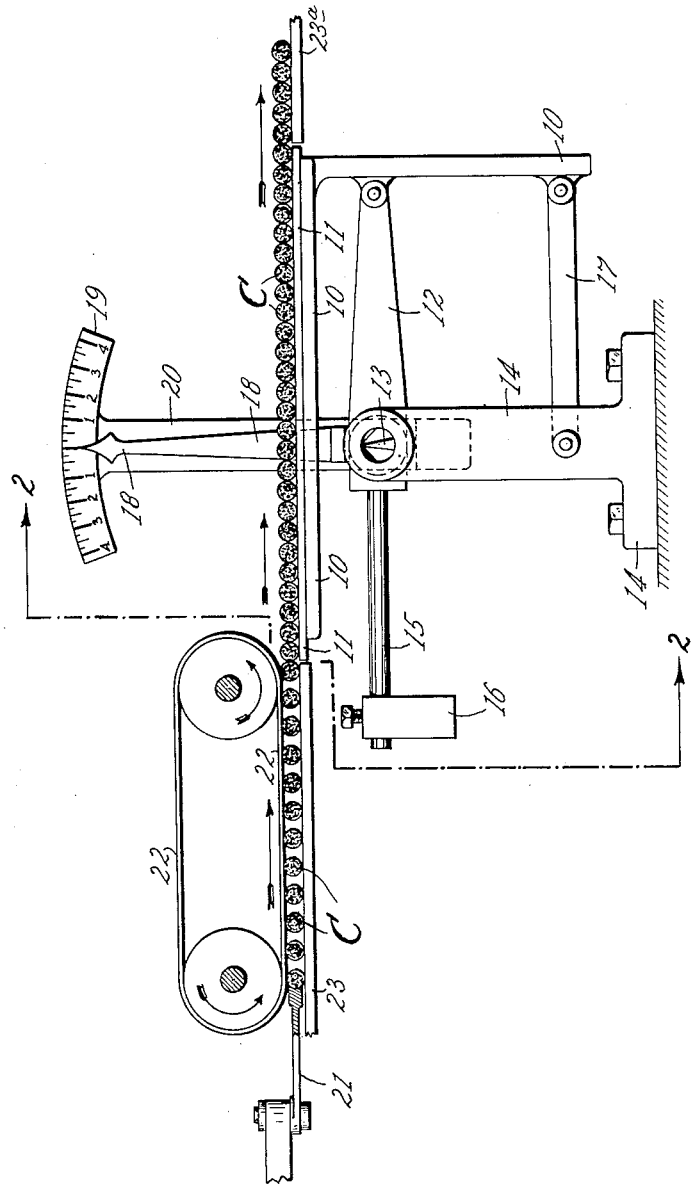
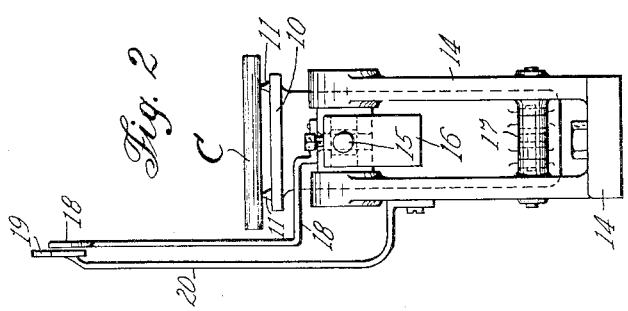
INVENTOR
George W. Gwinn
BY
George S. Hastings
ATTORNEY

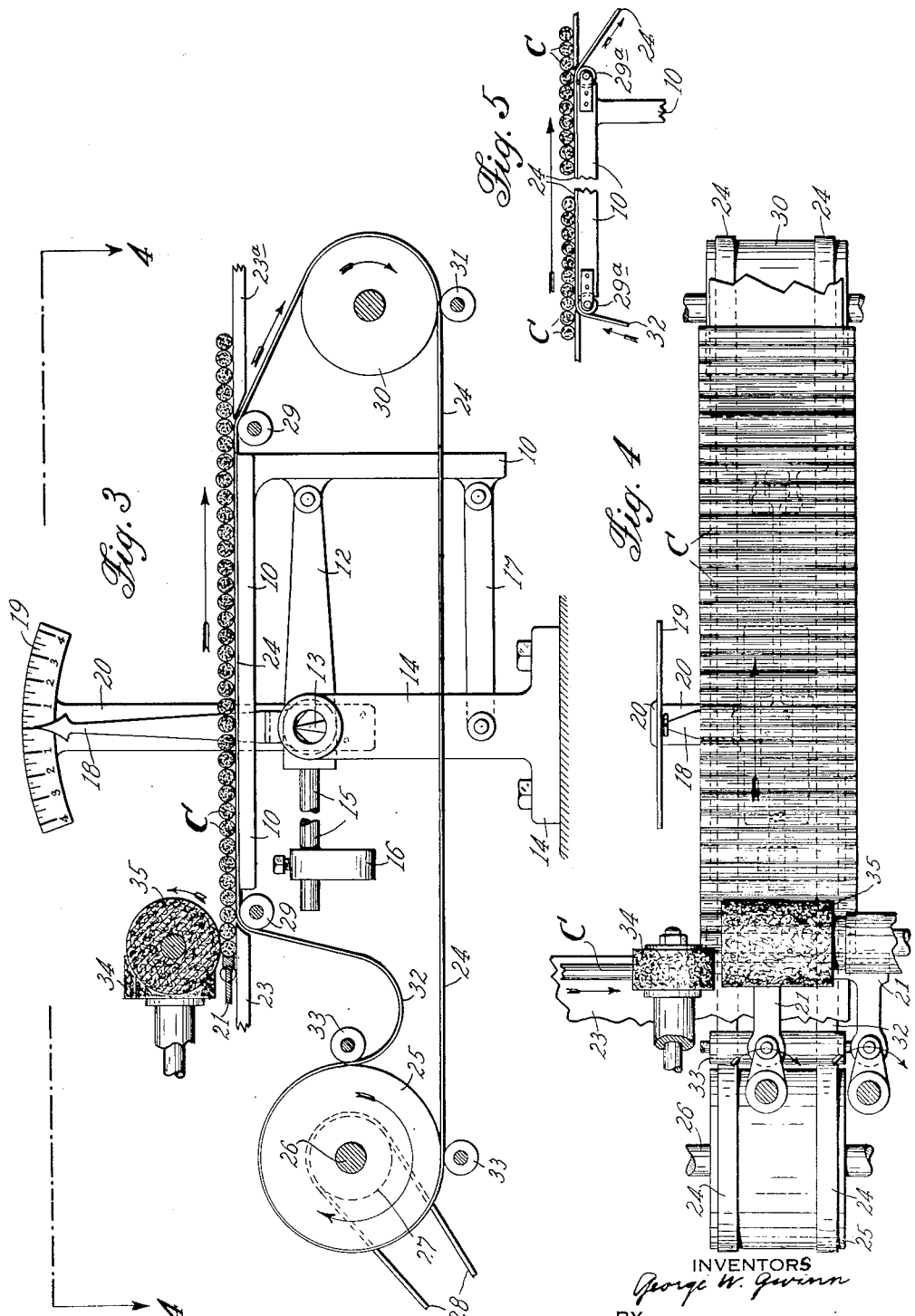

Patented Dec. 14, 1937

2,102,317

UNITED STATES PATENT OFFICE 2,102,317

CIGARETTE WEIGHER FOR CONTINUOUS-ROD CIGARETTE MACHINES

George W. Gwinn, Hewlett, N. Y., assignor to American Machine & Foundry Company, a corporation of New Jersey Application September 7, 1935, Serial No. 39,601

4 Claims. (Cl. 265—27)

This invention relates to continuous-rod cigarette machines, more particularly to an apparatus which continuously weighs and indicates the weight of a given quantity of cigarettes as they leave the cigarette machine.

The main object of this invention is to provide means for continuously weighing a predetermined number of cigarettes while advancing them over the platform of the weighing apparatus, thereby indicating whether the tobacco in the quantity of cigarettes being weighed, is of the desired density, or too tightly or too loosely packed. With this and other objects not specifically mentioned in view the invention consists in certain constructions and combinations hereinafter fully described and then specifically set forth in the claims hereunto appended.

In the accompanying drawings which form a part of this specification and in which like characters of reference indicate the same or like parts:

Fig. 1 is a side elevation of a continuous weighing apparatus in accordance with one embodiment of the invention;

Fig. 2 is an end elevation of the same taken on line 2—2 of Fig. 1;

Fig. 3 is a side elevation of a modified embodiment of the continuous weighing apparatus;

Fig. 4 is a plan view of the same taken on line 4—4 of Fig. 3; and

Fig. 5 is a detail side elevation of a modified form of weighing platform.

Generally stated, in the embodiments herein illustrated the cigarettes are advanced over the platform of a weighing apparatus in order that they may be continuously weighed. In the best constructions contemplated the cigarettes may be pushed on to the platform successively by a conveyor belt to assemble them side by side in contacting relation thereon, or the cigarettes may be delivered to a conveyor belt traveling continuously over the platform. Therefore the cigarettes will be removed from one end of the platform as fast as they are delivered to its other end, thus maintaining a constant number of cigarettes thereon. The devices selected to illustrate the invention may be widely varied in construction for they are but a few of the many possible concrete embodiments of the same. The invention, therefore, is not to be restricted to the particular embodiment chosen to illustrate the invention.

Referring to Figs. 1 and 2 of the drawings, the weighing apparatus may be provided with a weighing platform 10 on which may be mounted a pair of V-shaped guide rails 11 to reduce the friction of the cigarettes C passing thereover, to a minimum. To a downwardly extending leg on the platform 10 is pivotally connected a scale beam 12 fulcrumed on knife edges 13 secured to supporting brackets 14. The scale beam 12 is equipped with an arm 15 carrying an adjustably mounted counterpoise weight 16. In order to maintain the weighing platform 10 in a horizontal position, links 17 are pivoted to the supporting brackets 14 and pivotally connected to the leg of the platform 10 in parallelism to the scale beam. To scale beam 12 is also attached above its fulcrum a pointer 18 indicating on a suitably graduated scale 19 whether the cigarettes C on platform 10 are of the correct weight, or too light or too heavy. The scale 19 is fastened to an upright bar 20 attached to brackets 14.

The cigarettes C, after being cut off from the cigarette rod, enter a cigarette collector of any suitable or desired type, that disclosed in the co-pending application of G. W. Gwinn, et al., S. N. 698,207, filed Nov. 15, 1933, being chosen for exemplification herein. The orbitally moving pusher 21 of said cigarette collector contacts the side of the cigarette and pushes the same into the grip of a conveyor belt 22 which rolls the cigarette over a supporting table 23 on to the guide rails 11 of the weighing table 10. The cigarettes are pushed over the latter by means of the following cigarettes delivered by the conveyor belt 22, thus assuring the presence of a constant number of cigarettes on the platform 10 whereby the pointer 18 will indicate whether the cigarettes are of the correct weight or too light or too heavy, whereupon the operator can adjust the tobacco feed of the cigarette machine, if necessary. The leading cigarettes are pushed off the platform 10 by the following cigarettes on to a collector shield 23a where the cigarettes are collected by a catcher girl.

While in the weighing apparatus just described the cigarettes are pushed over the weighing platform 10, in the modified apparatus illustrated in Figs. 3, 4, and 5, the cigarettes are moved across the platform 10 by means of conveyor belts. As shown therein, the conveyor belts 24 are continuously driven by means of a driving pulley 25 mounted on a shaft 26 carrying a pulley 27 (Fig. 3) driven by means of a belt 28 from the main drive of the cigarette machine. The conveyor belts 24 are led over a pair of stationary guide rollers 29 located near each end of the platform 10 over which said belts 29 slide. The latter are also led over an idler pulley 30 which is equipped with a drag roller 31. The moving conveyor belts 24 have a slack or loop 32 which is checked by means of a pair of drag rollers 33 working in conjunction with driving pulley 25, wherefore the inaccuracy of weighing which would result from the pressure of taut belts on the platform 10 will be avoided. The cigarettes issuing from the cigarette machine cutoff are engaged and accelerated by the raised segment of a roll 34 to establish a spacing therebetween, and the spaced cigarettes are pushed sidewise by the pusher 21 under a friction roll 35 which serves to retard the endwise movement of the cigarettes while they are thus being delivered from the table 23 on to the belts 24. All of these parts of the cigarette catcher are described in the application mentioned above, and further description thereof herein is deemed unnecessary.

Instead of mounting guide rollers 29 independently of the platform 10, they can be mounted on the ends of the weighing table in a manner such as illustrated in Fig. 5. The rollers 29a then are part of the platform 10.

What is claimed is:

1. The combination with a weighing device provided with a platform adapted to support a predetermined number of cigarettes in side by side formation, of means for delivering cigarettes sidewise to said platform and simultaneously removing cigarettes therefrom to maintain a constant number of cigarettes on the platform, said means including a set of stationary guide rollers arranged adjacent each end of said platform, endless conveyor belts trained over said guide rollers and platform, a driving pulley over which said conveyor belts are looped, said belts being slack between the driving pulley and platform, drag rollers pressing said belts against said driving pulley, an idler pulley over which said belts are looped, a pressure roll holding said belts against said idler pulley, and mechanism for delivering cigarettes sidewise on to said belts above the set of guide rollers adjacent the slack in the belts.

2. The combination with a weighing device provided with a platform adapted to support a predetermined number of cigarettes in side by side formation, of means for delivering cigarettes sidewise to said platform and simultaneously removing cigarettes therefrom to maintain a constant number of cigarettes on the platform, said means including a set of guide rollers mounted on the ends of said platform, endless conveyor belts trained over said guide rollers and platform, a driving pulley over which said belts are looped, said belts being slack between the driving pulley and platform, drag rollers pressing said belts against said driving pulley, an idler pulley over which said belts are looped, and a pressure roller holding said belts against said idler pulley.

3. The combination with a horizontal table and means for feeding cigarettes sidewise in abutting relation thereover, of a weighing platform positioned adjacent to said table and aligned therewith, said platform being of a length sufficient to accommodate and weigh a predetermined number of contacting cigarettes passing thereover, means mounting said platform for vertical parallel motion, and means located in a horizontal plane and in alignment with said platform and table for receiving cigarettes in a substantially unbroken stream as they move off said platform.

4. The combination with a cigarette machine collector operating to accelerate the cigarettes delivered endwise from a cigarette machine cutoff and then space the same, said collector including a member acting to displace all the spaced cigarettes sidewise, of a weighing device comprising a substantially horizontal platform of a length sufficient to weigh a predetermined number of cigarettes, a feeding surface located in the same plane as said platform and adjacent thereto over which said cigarettes are fed in an unbroken stream onto said platform, means mounting said platform for vertical parallel motion only, and a receiving surface adjacent said platform onto which said cigarettes move in abutting relationship from said weighing platform.

GEORGE W. GWINN.